United States Patent [19]

Snedkerud

[11] Patent Number: 4,489,411
[45] Date of Patent: Dec. 18, 1984

[54] PROCESS AND A CIRCUIT ARRANGEMENT FOR SIGNAL TRANSMISSION USING AN AMPLITUDE-MODULATED RADIO BROADCASTING SYSTEM

[75] Inventor: Ole Snedkerud, Windisch, Switzerland

[73] Assignee: BBC Brown, Boveri & Company, Limited, Baden, Switzerland

[21] Appl. No.: 552,021

[22] Filed: Nov. 17, 1983

Related U.S. Application Data

[63] Continuation-in-part of Ser. No. 380,918, May 21, 1982, abandoned, which is a continuation of Ser. No. 110,823, Jan. 10, 1980, abandoned.

[30] Foreign Application Priority Data

Feb. 8, 1979 [CH] Switzerland ............... 1225/79

[51] Int. Cl.³ ............................................. H04J 9/00
[52] U.S. Cl. ........................................ 370/11; 381/15; 381/16
[58] Field of Search .............. 370/11; 381/15, 16, 381/4; 375/65; 331/177 V

[56] References Cited

U.S. PATENT DOCUMENTS 2,808,508 10/1957 Sinninger ........................ 370/11
2,912,492 11/1959 Haantjes et al. ................. 370/11
3,506,784 4/1970 Garland ........................... 375/65
3,553,367 1/1971 Krauss ............................. 370/11
3,916,344 10/1975 Enderby ...................... 331/177 V
4,088,968 5/1978 Pradal et al. ................ 331/177 V

FOREIGN PATENT DOCUMENTS

1023963 3/1966 United Kingdom .

Primary Examiner—Douglas W. Olms
Attorney, Agent, or Firm—Oblon, Fisher, Spivak, McClelland & Maier

[57] ABSTRACT

For the simplified text or picture data signal transmission through a broadcasting system, an additional phase and/or frequency modulation is produced in amplitude modulated transmitters. In a preferred but relative slow transmission system, a frequency modulation $(f_1-f_n)$ occurs in a band width of ±25 Hz, whereby the transmitted quality of the simultaneously transmitted broadcast does not suffer. Depending on the type of transmission means, equipment and frequency $(f_o)$ of the carrier wave (T), this band width can be increased, for example during text transmission, in order to achieve a higher transmission speed. The system is compatible with AM mono and stero equipment as well as with printing and display installations of the electronic data processing and communication technologies.

15 Claims, 9 Drawing Figures

PROCESS AND A CIRCUIT ARRANGEMENT FOR SIGNAL TRANSMISSION USING AN AMPLITUDE-MODULATED RADIO BROADCASTING SYSTEM

CROSS REFERENCE TO RELATED APPLICATION

This application is a continuation-in-part of my commonly assigned, now abandoned, U.S. patent application Ser. No. 380,918, filed May 21, 1982, which is a continuation of now abandoned Ser. No. 110,823, filed Jan. 10, 1980.

BACKGROUND OF THE INVENTION

The present invention relates to a process and a circuit arrangement for the transmission of data signals with the simultaneous transmission of a radio broadcast between an amplitude-modulated broadcast transmitter and receiver including phase and/or frequency modulation as well as amplitude-modulation of a common carrier.

Such a process is well known from the U.S. Pat. No. 2,808,508 to Sinninger, where a common carrier wave is utilized to transmit and receive an amplitude-modulated audio intelligence and coincidently carries a teletype intelligence by the frequency shift of that carrier wave.

However, to receive that amplitude modulated intelligence with optimum fidelity and minimum distortion, it is desirable to minimize the interference arising during the transmission process between the two intelligences impressed on one common carrier.

According to the Sinninger patent interference is substantially eliminated by the use of an improved radio receiver apparatus, which is adapted to receive a signal carrying intelligences thereon produced both by amplitude and frequency variation, wherein each variable is free of interference or distortion which might be produced by the other.

However, eliminating the interference in accordance with the teachings of the Sinninger patent requires the installation of a new generation of AM-receivers to meet the fidelity requirements related to the above-mentioned transmission process.

SUMMARY OF THE INVENTION

The purpose of the invention is to provide a process which is realisable with little technical effort and which has a high degree of freedom from interference.

Accordance to the invention there is provided a process for the transmission of data signals with the simultaneous transmission of a radio broadcast between an amplitude-modulated broadcast transmitter and receiver including phase and/or frequency modulation as well as amplitude-modulation of a common carrier, wherein in the transmitter, a carrier wave with a frequency between 50 kHz and 30 MHz is generated, and a sequence of binary data signals carrying information is generated in a first signal source. The sequence is modified in such a way that, the overall time average of the sequence is zero, and the bandwidth of the modified sequence is limited to frequencies equal to or less than 300 Hz. The carrier wave is at first phase and/or frequency modulated by that bandwidth limited sequence, such that no distortion or only amplitude distortions of less than 3% arise during the radio transmission and the neighboring radio channels are undisturbed. The phase and/or frequency modulated carrier wave is then amplitude-modulated by an audio signal from a second signal source, the modulated carrier wave is amplified and transmitted via an antenna. Furthermore, in the receiver that transmitted carrier wave is received and demodulated at least with regard to its phase and/or frequency modulation in order to recover the bandwidth limited sequence, this recovered sequence is then pulse-shaped to restore the binary form of the data signals, and the information carried by those data signals is displayed.

In order to modify the sequence of binary data signals, as above indicated, according to the invention there is provided an encoder of the type disclosed in British Pat. No. 1,023,963 to Scantlin, the disclosure of which is incorporated herein by reference.

The process as above-explained distinguishes itself through the advantageous use of existing broadcasting equipment. It can be realized to such an extent that only minimal amplitude distortions occur, i.e. also intermodulations and/or cross pick-up and cross-talk. Especially there is no need to make any changes in existing AM receivers as far as the amplitude-modulated audio intelligence is concerned.

In a preferred embodiment of the process the frequency shift of the modulated carrier wave is limited to ±25 Hz making sure that any conventional filtering means in the receiver does not generate additional distortions of the audio intelligence.

The solution of codifying the sequence of data signals, especially according to the ASCII code, produces a compatibility with existing electronic data processing and telex equipment. (See ITT Reference Data for Radio Engineers, Sixth Edition, 1975, page 35–45).

The advantage of the solution wherein in the receiver the pulse-shaped sequence of data signals is stored in memory and read-out, repeatedly generating a picture on a TV screen, lies in the possibility of transmitting pictures and so forth.

Another solution of displaying the transmittal information on an alphanumeric display favors the development of a low cost and compact self-contained AM receiver with information processing capability.

The circuit arrangement for carrying out the process in an amplitude-modulated radio transmitter comprises an oscillator tuned to a frequency between 50 kHz and 30 MHz, a first and a second signal source, and means for modifying a sequence of binary data signals from the first signal source in such a manner that the overall time average of that sequence is zero. Additionally, there are provided means connected to those modifying means for limiting the bandwidth of the modified sequence, means for phase and/or frequency modulating a carrier wave generated in the oscillator by that modified and bandwidth limited sequence, means for amplitude modulating the phase and/or frequency modulated carrier wave by an audio signal of the second signal source, and means for amplifying and transmitting the modulated carrier wave. The receiver comprises means for receiving the modulated carrier wave, means for demodulating the modulated carrier wave to recover that sequence, a pulse shaper connected to those demodulating means, and means for displaying information carried by that sequence.

The circuit arrangement as discussed above can be very simply integrated into an existing broadcast transmitter and is very economical.

The use of a varactor diode in a reactance stage connected in series with the oscillator and a low-pass filter with a cut-off frequency equal to or less than 300 Hz arranged between the first signal source and the varactor diode allows a low frequency modulation of an AM-transmitter, and is particularly suitable for modern installations with transistorized oscillator-exciters.

The use of a printer or teletype apparatus for information display has the advantage of particular simplicity of the system in the receiver part or section.

The proposed solution of using a text recording device comprising a data storage system and a display allows the use of scanning displays and/or the display of selected parts of the transmitted information.

An arrangement with an LCD-display or electrochromic cell is also suitable for displaying information in small battery powered portable equipment.

A CRT screen display in connection with the storage system makes it possible to use existing television equipment.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
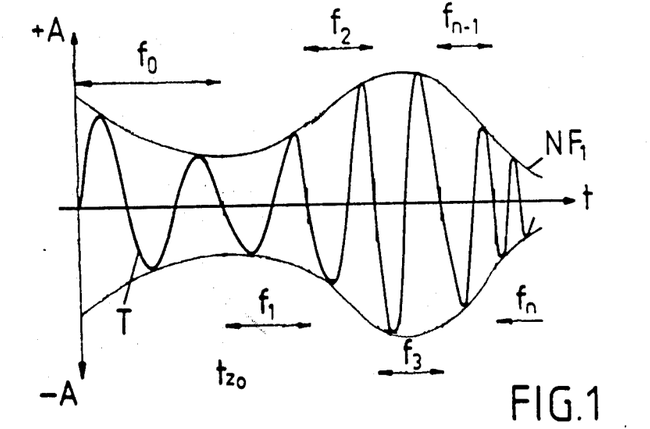
FIG. 1 is a time-amplitude characteristic of a frequency and amplitude modulated carrier wave.

In the time-amplitude characteristic of FIG. 1, the envelope curve of an amplitude-modulated carrier wave T is indicated as $NF_1$. The carrier wave T has for broadcasting purposes a constant frequency $f_0$ and is now frequency modulated corresponding to a data signal representing the data to be transmitted, so that at the start of the signal transmission at a time $t_{Z_0}$ the carrier wave T has a variable frequency $f_1, f_2 \ldots f_n$.

In the preferred embodiment $f_n - f_{n-1} = \Delta f$ where $/\Delta f/ \leq 25$ Hz. No interference to the radio broadcast occurs as a consequence of this small frequency fluctuation of ±25 Hz.

Figure 2:
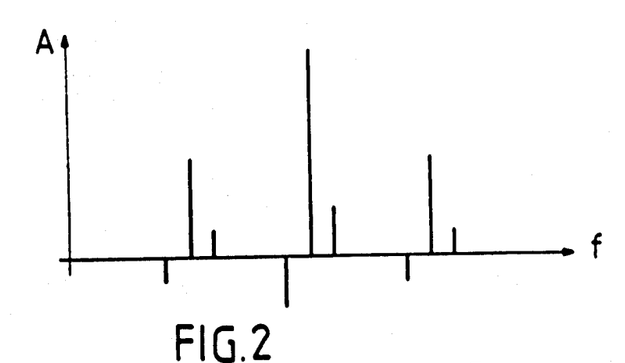
FIG. 2 is the spectrum of a phrase and amplitude modulated carrier wave.

By analogy a phase modulation can be used for signal transmission during a broadcast; a characteristic spectrum, amplitude A as a function of the frequency f is shown in FIG. 2.

Figure 3:
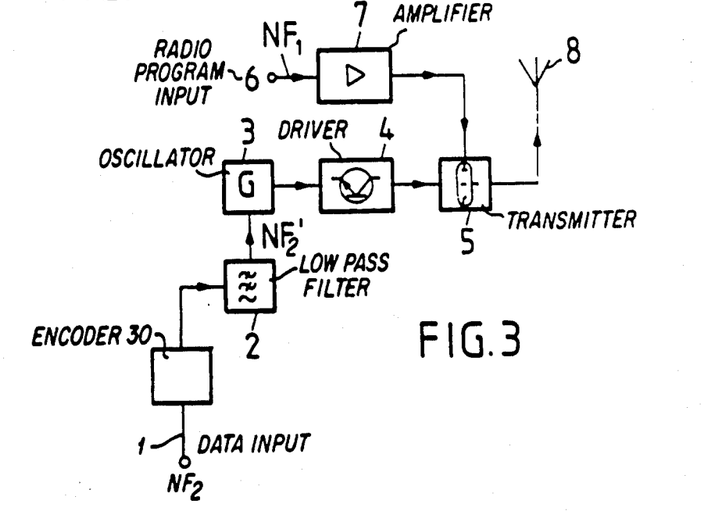
FIG. 3 is a block circuit diagram of an AM-radio transmitter intended for data signal transmission.

The simplified block circuit diagram of an AM-broadcasting transmitter, FIG. 3, suitable for signal transmission during radio broadcasts, has a data signal input marked as 1. The data signal input 1 is fed to an encoder 30, having an output connected to a low-pass filter 2 whose output is connected to the control input of an oscillator 3. The output of the oscillator 3 is fed to the input of a HF-exciter or driver stage 4 whose output goes to a HF end-stage 5, essentially a known transmitter or emitting circuit with plate modulation. The amplitude modulation takes place such that the low frequency radio program $NF_1$ is fed to the NF input and then in a modulating amplifier 7 is amplified to the modulation of the HF-end stage 5. A transmitting antenna 8 emits both the radio broadcasting signal and the data signal to be transmitted.

The mode of operation of the additional components 30, 2, 3 and 4 inserted for data signal transmission is next described.

The transmitter of FIG. 3 also includes an encoder 30 for converting the input data to a code suitable for use with the transmitter.

The information to be transmitted by shifting phase of the carrier may initially have any form but is converted to binary form prior to transmission. The phase of then carrier is shifted ordinarily in the range of plus and minus 180 or less with a positive change or shift corresponding to one level and hence one state of the code and a negative change or shift corresponding to the other level and other state of the code. It is preferred to operate the system with a pulse code in binary form having a zero average value and this pulse code is identified herein as an a.c. code, indicating that it has no d.c. component. The encoder 30 of FIG. 7 illustrates one form of circuit for converting a standard binary code to the a.c. code.

Figure 7:
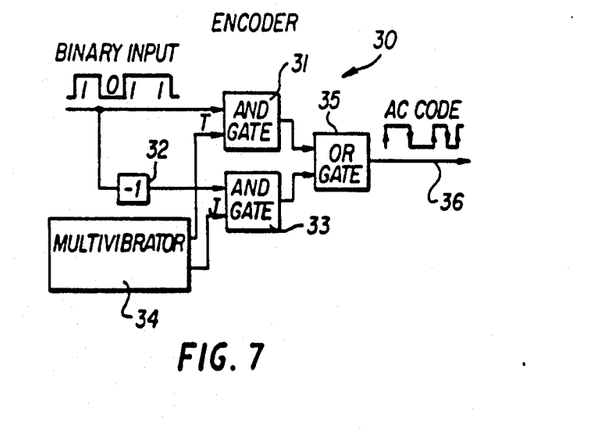
FIG. 7 is a block diagram of an encoder for modifying a sequence of binary signals such that the overall time average of the sequence is zero.

Referring to FIG. 7, the binary input is connected directly to an AND gate 31 and through an inverter 32 to a second AND gate 33. A typical binary coded signal is shown in the first line of FIG. 8 and the output of the inverter 32 corresponding to this signal is shown in line 2. A multivibrator 34 or other source of timed pulses is operated at the clock frequency or information rate of the binary input with the true multivibrator output connected to the AND gate 31 and the inverted multivibrator output connected to the AND gate 33. The multivibrator wave forms are shown at lines 3 and 4 of FIG. 8.

The AND gates 31, 33 are connected to an OR gate 33 which provides an output on line 36 to the filter 2. The output of the OR gate is the a.c. code corresponding to the binary input of line 1 of FIG. 8 and is shown on line 5 of FIG. 8.

Figure 8:
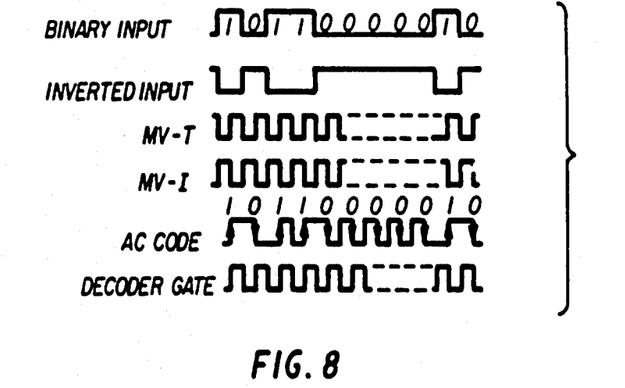
FIG. 8 is a timing diagram illustrating selected waveforms in the encoder shown in FIG. 7.

For the system illustrated herein, a binary ONE is encoded as a postive change in the a.c. code and a binary ZERO is encoded as a negative change in the a.c. code. (The phasing may be reversed, but this convention is followed in the discussion herein). If two consecutive binary ONES are to be sent, a negative change must be introduced between the two positive changes so that the second positive change is possible. These intermediate changes are introduced by means of the multivibrator and gates of the encoder. In the diagram of FIG. 8 the changes which correspond to the binary bits are indicated by arrows while the intermediate changes which do not carry information corresponding to the input have no arrows. It is seen that the frequency of transitions when sending all ONES or all ZEROS is double the bit rate of the binary input while the transition frequency for alternate ONES and ZEROS is equal to the bit rate.

The data signal $NF_2$ representing the data to be transmitted experiences a limitation of its band width in the low-pass filter 2 and subsequently as data signal $NF_2'$ controls the phase modulation of the oscillator 3. The HF-exciter or driver stage 4 amplifies the output signal of the oscillator 3 to a signal level suitable for regulating the HF-end-stage 5.

Figure 4:
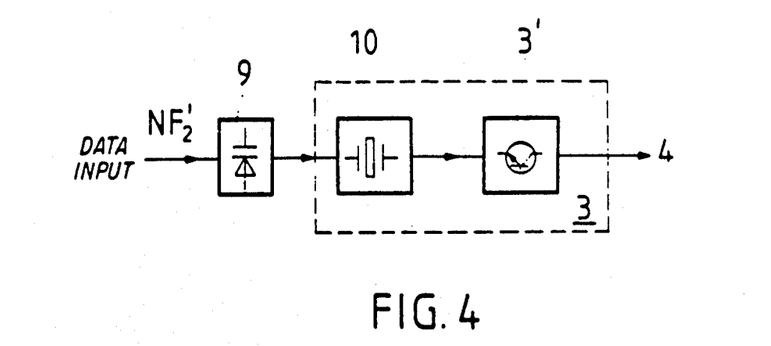
FIG. 4 is a further block circuit diagram for a transmitter as in FIG. 3.

A particularly economic circuit arrangement for the phase and/or frequency modulation of an existing transmitter or emitter has a reactance stage, FIG. 4, which is made from a varactor diode and is controlled by the data signal $NF_2'$. The output of the reactance stage 9 influences a quartz oscillator 10 and thereby causes a frequency and/or phase modulation of the oscillator 3.

Figure 5:
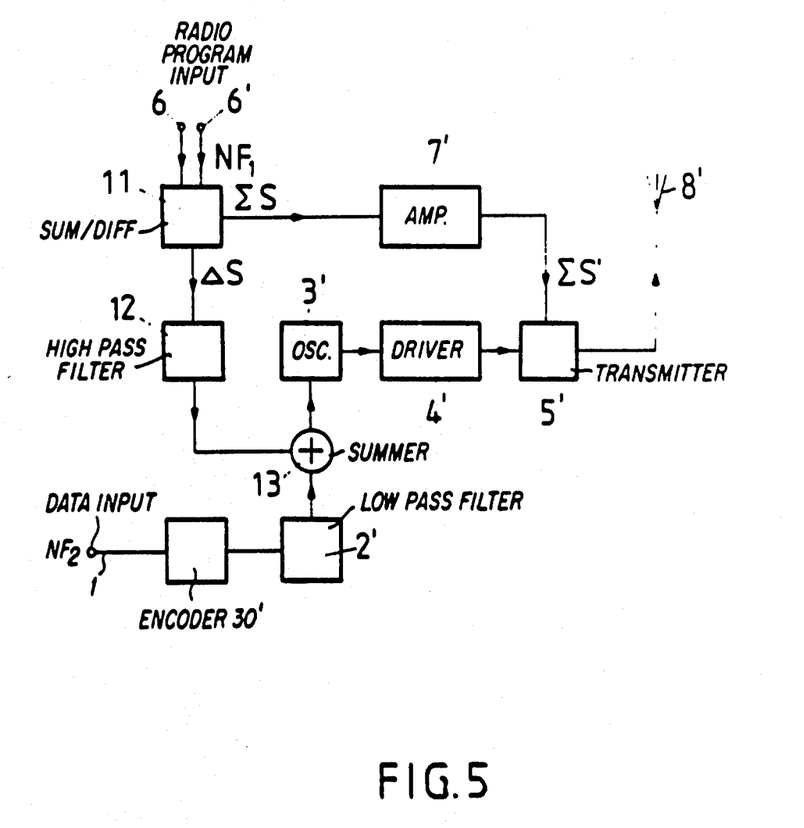
FIG. 5 is a block circuit diagram of an AM-stereo broadcast transmitter suitable for signal transmission.

The process according to the invention can also be used for the case of an AM-stereo broadcast transmitter as is shown in FIG. 5.

At the NF inputs 6, 6', the low frequency radio program $NF_1$ is fed using known methods to two channels of a sum-difference frequency network 11. One output of this sum-difference frequency network 11 goes to a modulating amplifier 7' and supplies such with a signal $\epsilon S$ while the second output of the sum-difference frequency amplifier 11 carries a signal $\Delta S$ and is connected to the input of a high-pass filter 12. The signal $\epsilon S'$ which is amplified in the modulation amplifier 7 is fed to an HF-end stage and causes here an amplitude modulation. The output of the high-pass filter 12 is connected to a summing stage 13, in which a data signal $NF_2$ introduced through the data signal input 1 is added after limiting encoding by encoder 30 and in a low-pass filter 2'. The output of the summing stage 13 is connected to the HF end stage 5' via an oscillator 3' and an HF-inner stage or exciter 4'.

This circuit arrangement for phase and/or frequency modulation operates as is described in FIG. 4; the AM-stereo broadcast signal and the frequency and/or phase modulated signal used for data transmission are emitted from the transmitting aerial 8'.

Figure 6:
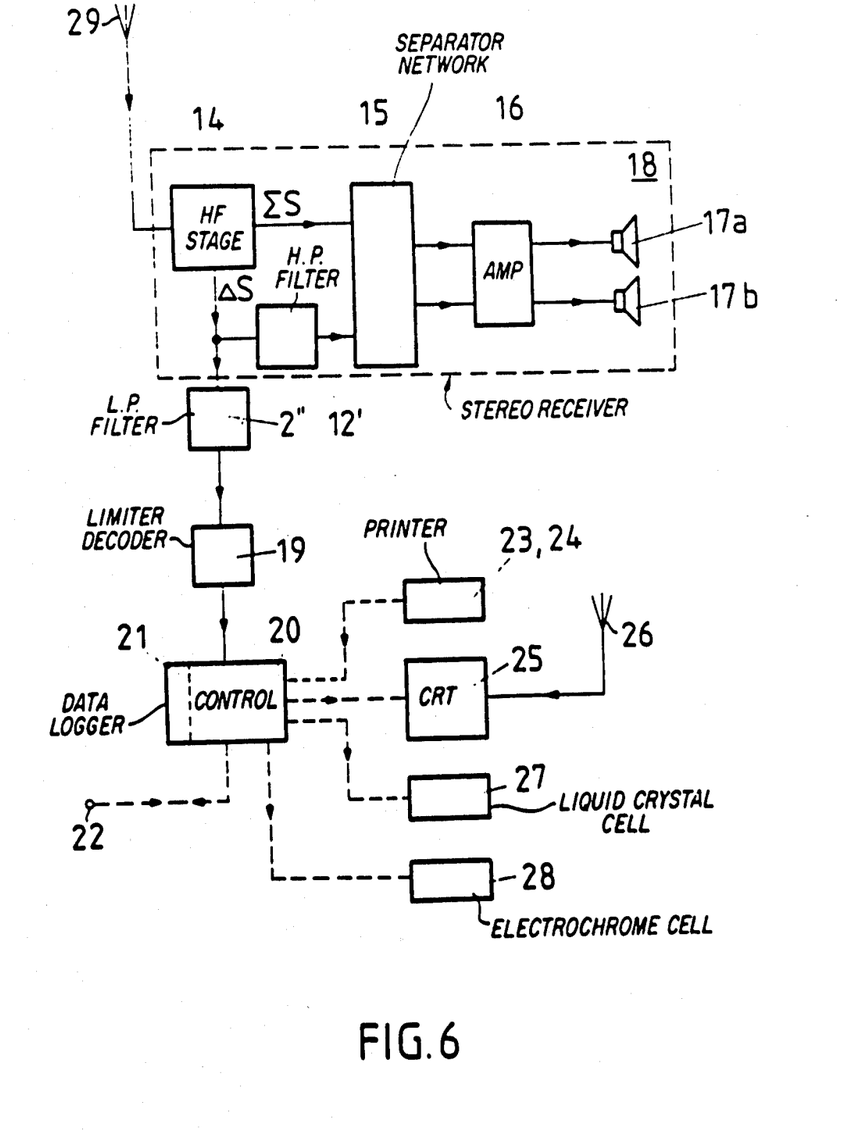
FIG. 6 is a block circuit diagram of an AM-stereo broadcast receiver also suitable for receiving signals.

An AM-stereo broadcast receiver suitable for receiving the transmitted data signal is shown in FIG. 6. A stereo receiver part 18 receives an HF-signal via a radio receiving aerial 29 to an HF-stage 14 (with mixer, intermediate frequency overlap) from whose output the signals $\epsilon S$, $\Delta S$ are taken. The signal $\epsilon S$ is carried directly to the input of a separator network and the signal $\Delta S$ via a high-pass filter 12' to the second input of the circuit 15. The outputs of the network 15 form the two stereo LF-channels, from which the corresponding signals are amplified in a stereo amplifier 16 and fed to loudspeakers 17a, 17b in the usual way.

To construct the data signal, the signal $\Delta S$ is taken from the stereo receiver part 18 and fed to a low-pass filter 2" to be filtered, and subsequently transformed in a signal converter 19 (includng a delimiter with high amplification and decoder) to square wave impulses, which are available in the control equipment 20 for connection to printing or display equipment whichever is chosen. These are a facsimile clear text printer 23, a teletype writer or teleprinter apparatus 24, a cathode ray tube (television set) 25, a liquid crystal cell 27 or an electrochrome cell 28. In addition a telephone connection is also provided for in the control equipment 20, which makes possible data exchange over a telephone line. Depending on the type of the display equipment, a data logger 21 already present in the control equipment 20 can be used, particularly for text or picture transmission if the cathode ray tube 25 of an operating television set (represented schematically by a television receiving antenna 26) or a liquid crystal cell 27 is used.

Figure 9:
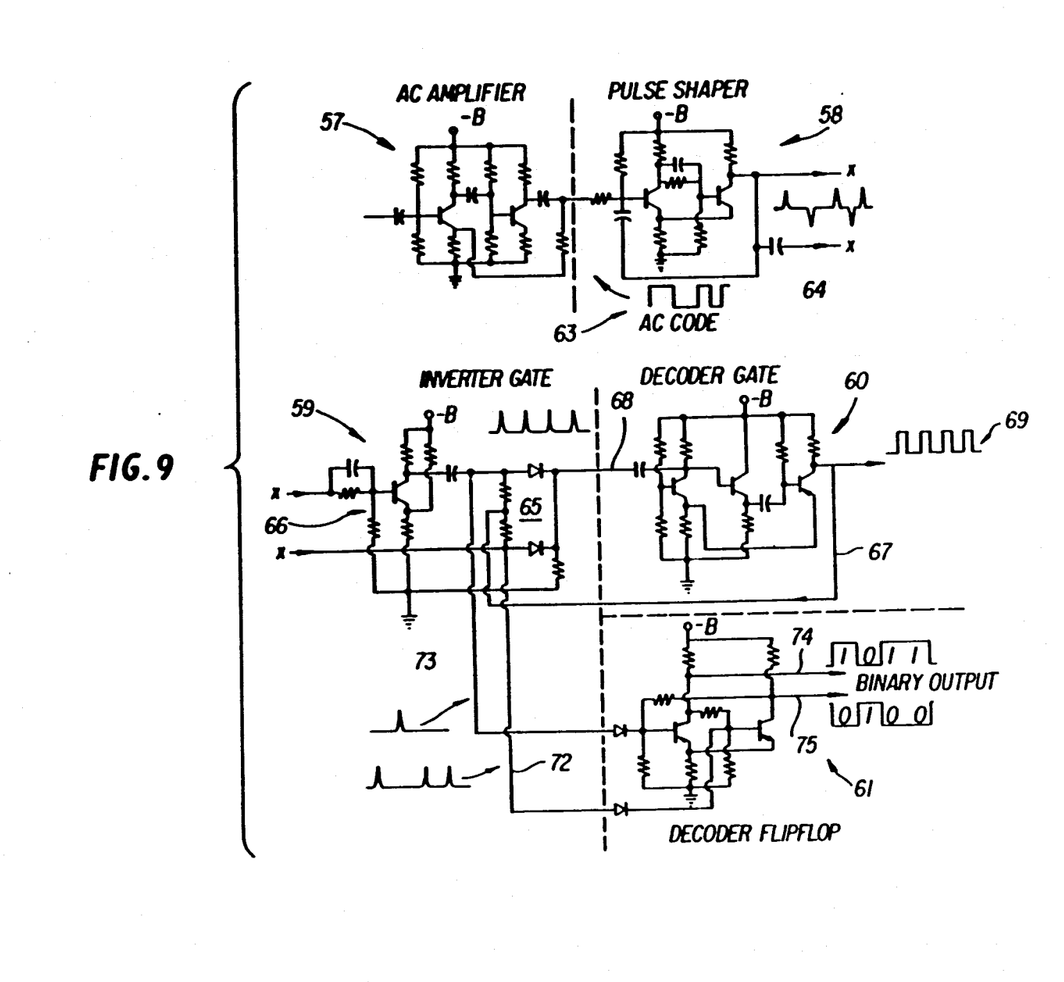
FIG. 9 is a circuit diagram of a decoder circuit for decoding the sequence of binary data signals received at a receiver according to the invention.

One embodiment of a limiter/decoder stage 19 is shown in FIG. 9. The output of the filter 2" is an audio frequency signal which corresponds to the a.c. code phase (or frequency) modulated on the r.f. carrier. The low pass filtered audio frequency signal is amplified and clipped in the a.c. amplifier 57 resulting in an output substantially identical to the input a.c. code as shown at 63. The pulse shaper 58 is a circuit of the Schmitt trigger type which produces an output pulse for each change in level of the a.c. code. The output of the pulse shaper 58 is connected through a capacitor 64 to the diode OR gate 65 and also through an inverter 66 to the gate 65.

Originally the output of the inverter gate would include a positive pulse for each change of the a.c. code. However, the non-information carrying pulses corresponding to the non-information carrying changes in the code are blocked from the inverter gate output by a signal fed back from the decoder gate 60 on the line 67. The decoder gate 60 is a one-shot multivibrator triggered by the output 68 of the inverter gate. The one-shot multivibrator has a delay built in so that it cannot be fired in less than one half of a clock cycle after a preceding firing. Hence the decoder gate will not follow the double clock frequecny pulses which occur when a series of ONES or a series of ZEROS are being transmitted but will follow pulses corresponding to alternate ONES and ZEROS which pulses occur at the clock rate of the binary input.

The decoder gate output indicated at 69 and at the bottom line of FIG. 8 provides a synchronizing pulse train which is exactly in synchronism with the clock rate of the binary input to the encoder. The output of the decoder gate operating through the line 67 blocks the output of the inverter gate for a period greater than one-half a clock cycle after a decoder gate pulse thereby blocking the non-information carrying pulses from the output of the receiver.

The pulse train appearing on the line 72 corresponds to the binary input with each pulse being a ONE. Similarly, the pulse train on the line 73 corresponds to the binary input with each pulse being a ZERO. The signals on the lines 72, 73 are used to trigger the decoder flip-flop 61 to produce the binary input and the inverse of the binary input on line 75.

The transmission system of the invention has a number of unique features and advantages. Binary data may be transmitted on a conventional broadcasting station without affecting the audio frequency signal being transmitted thereby. The binary information is produced at the receiver together with a synchronizing pulse train thereby eliminating any requirements for a time base generator at the receiver. The system utilizes a pulse code having no d.c. component, hence there is no requirement that a d.c. level be maintained in the receiver. This materially reduces the frequency stability requirements of the intermediate frequency and phase shift detector, permitting conventional crystals to be used in the local oscillator and in the detector. The intermediate frequency may drift up and down over wide values between the series resonance and anti-resonance frequencies of the phase detector crystal without affecting the operation of the system.

Also, the low pass filtering provided by the filter 2, which limits the bandwidth of the modified binary sequence at the output of the encoder 30, prevents intermodulation between the two kinds of modulation, phase and amplitude, imposed on the r.f. carrier, as next explained.

In the case of phase modulation (FM) the maximum frequency excursion or frequency deviation ($\Delta\omega$) is proportion to the angle ($\Delta\theta$) (in this case $\pm 180$) degrees and the modulation frequency. In this case the modulation frequency includes the frequency components of the continuous spectrum of the pulse train (square waves) (see for example "ITT Reference Data for Radio Engineers", Fourth Edition, 1956, page 533).

It is therefore of major importance to restrict the bandwidth of the modulated PM signal to a minimum to prevent intermodulation between the two kinds of modulation simultaneously made on the same carrier. The problem arises on the receiver side (in the broadcast receiver) if the frequency deviation is too high, i.e. higher than necessary. If the receiver is not a crystal-controlled one, which is always the case for broadcast receivers, the mid-frequency of the receiver may have an offset. Then the if-bandfilter characteristic looks unsymmetrically, and when the composite signal contains a signal component with a higher frequency, i.e. higher sidebands (AM), these components may additionally be amplitude modulated, because the upper and lower sidebands (which also are simultaneously phase modulated) are treated differently due to the unsymmetry, but synchronously to the PM signal. If the IF bandfilter is unsymmetrical, such effects may also occur without any frequency offset. Only in the case when the PM (or FM) signal is bandlimited, can the intermodulation figure be kept below a certain low non-disturbance level, and that is achieved by the present invention.

It should also be noted that a simultaneous phase and frequency modulation can be used for data signal transmission, provided the characteristic boundary conditions indicated in the process heretofore described are observed. The transmission speed of the system can additionally be increased if, for example, the band width of the data signal $NF_2$ is increased to e.g. 300 Hz at the expense of the transmission quality of the radio program.

While there are shown and described present preferred embodiments of the invention, it is to be distinctly understood that the invention is not limited thereto, but may be otherwise variously embodied and practiced within the scope of the following claims.

Accordingly, What I claim is:

1. A process for the transmission of data signals with the simultaneous transmission of a radio broadcast between an amplitude-modulated broadcast transmitter and receiver including phase and/or frequency modulation as well as amplitude modulation of a common carrier, comprising the steps, wherein:

in said transmitter:
   a carrier wave with a frequency between 50 kHz and 30 MHz is generated; a sequence of binary data signals carrying an information is generated in a first signal source; said sequence is modified in such a manner that the overall time average of said sequence is zero; the bandwidth of said modified sequence is limited to frequencies equal to or less than 300 Hz; said carrier wave is at phase and/or frequency modulated by said bandwidth limited sequence, such that no distortion or only amplitude distortions of less than 3% arise during the radio transmission and the neighboring radio channels are undisturbed; said phase and/or frequency modulated carrier wave is then amplitude modulated by an audio signal from a second signal source; said modulated carrier wave is amplified and transmitted via an antenna; and wherein in said receiver:
   said transmitted carrier wave is received and demodulated at least with regard to its phase and/or frequency modulation to recover said bandwidth limited sequence; said recovered sequence is then pulse-shaped to restore the binary form of said data signals, and said information carried by said data signals is displayed.

2. The process according to claim 1, wherein: the frequency shift of said modulated carrier wave is limited to $\pm 25$ Hz.

3. The process according to claim 1, wherein:
   in said transmitter:
   said sequence is codified prior to said modification process;
   in said receiver:
   said codified sequence is decoded before said information is displayed.

4. The process according to claim 3, wherein:
   said sequence is codified according to the ASCII code.

5. The process according to claim 1, wherein:
   in said receiver:
   said pulse-shaped sequence of data signals is stored in a memory and read out repeatedly generating a picture on a TV screen.

6. The process according to claim 1, wherein:
   in said receiver:
   said information is displayed on an alphanumeric display.

7. A circuit arrangement for the transmission of data signals with the simultaneous transmission of a radio broadcast between an amplitude-modulated broadcast transmitter and receiver including phase and/or frequency modulation as well as amplitude modulation of a common carrier, comprising:

in said transmitter:
   an oscillator tuned to a frequency between 50 kHz and 30 MHz; a first and a second signal source; means for modifying a sequence of binary data signals from said first signal source in such a manner that the overall time average of said sequence is zero; means connected to said modifying means for limiting the bandwidth of said modified sequence; means for phase and/or frequency modulating a carrier wave generated in said oscillator by said modified and bandwidth limited sequence; means for amplitude modulating said phase and/or frequency modulated carrier wave by an audio signal of said second signal source; and means for amplifying and transmitting said modulated carrier wave;

in said receiver:
   means for receiving said modulated carrier wave; means for demodulating said modulated carrier wave to recover said sequence; a pulse shaper connected to said demodulating means; and means for displaying an information carried by said sequence.

8. The circuit arrangement according to claim 7, wherein:
   in said transmitter:

a reactance stage is connected in series with said oscillator.

9. The circuit arrangement according to claim 8, wherein:

at least one varactor diode is arranged in said reactance stage of said oscillator and a low-pass filter with a cut-off frequency equal to or less than 300 Hz is arranged between said first signal source and said varactor diode.

10. The circuit arrangement according to claim 7, wherein:

in said receiver:

a printer is connected to said pulse shaper to display said information.

11. The circuit arrangement according to claim 7, wherein:

in said receiver:

a teletype writer apparatus is connected to said pulse shaper to display said information.

12. The circuit arrangement according to claim 7, wherein:

in said receiver:

a text recording device comprising a storage system and a display is connected to said pulse shaper.

13. The circuit arrangement according to claim 7, wherein:

in said receiver:

said displaying means is an LCD-display.

14. The circuit arrangement according to claim 7, wherein:

in said receiver:

said displaying means is an electrochromic cell.

15. The circuit arrangement according to claim 11, wherein:

said display is a CRT-screen.

* * * * *